(12) United States Patent
Schlesiger et al.

(10) Patent No.: US 7,683,110 B2
(45) Date of Patent: Mar. 23, 2010

(54) PREPARATION OF CELLULOSE ETHER PRODUCTS OF INCREASED VISCOSITY AND FINENESS

(75) Inventors: Hartwig Schlesiger, Walsrode (DE); Roland Bayer, Walsrode (DE); Daniel Auriel, Bad Fallingbostel (DE); Jürgen Engelhardt, Bad Fallingbostel (DE); Frank Höhl, Neuenkirchen (DE); Erik-Andreas Klohr, Walsrode (DE); Arne Henning Kull, Bomlitz (DE); Jörn-Bernd Pannek, Bad Fallingbostel (DE); Marc Oliver Schmidt, Königsstein (DE)

(73) Assignee: Dow Global Technologies Inc, Midland, MI (US)

( * ) Notice: Subject to any disclaimer, the term of this patent is extended or adjusted under 35 U.S.C. 154(b) by 188 days.

(21) Appl. No.: 11/505,278

(22) Filed: Aug. 15, 2006

(65) Prior Publication Data

US 2007/0088106 A1  Apr. 19, 2007

(30) Foreign Application Priority Data

Aug. 16, 2005   (DE) ................... 10 2005 038 584

(51) Int. Cl.
*C08L 1/26* (2006.01)
*B02C 17/00* (2006.01)

(52) U.S. Cl. .............. 524/42; 524/43; 524/46; 524/560; 524/563; 524/555; 241/24.1; 241/22

(58) Field of Classification Search ........... 524/35, 524/42, 43, 44, 46, 560, 563, 555; 241/24.1, 241/22, 23
See application file for complete search history.

(56) References Cited

U.S. PATENT DOCUMENTS

| | | | | | |
|---|---|---|---|---|---|
| 4,091,205 | A | * | 5/1978 | Onda et al. | 536/86 |
| 4,487,864 | A | | 12/1984 | Bermudez et al. | |
| 4,654,085 | A | * | 3/1987 | Schinski | 524/5 |
| 4,979,681 | A | * | 12/1990 | Donges et al. | 241/17 |
| 5,258,429 | A | * | 11/1993 | Kniewske et al. | 524/31 |
| 5,432,215 | A | * | 7/1995 | Girg et al. | 524/28 |
| 7,491,755 | B2 | * | 2/2009 | Bayer et al. | 524/5 |
| 2004/0225035 | A1 | * | 11/2004 | Schlesiger et al. | 524/42 |
| 2005/0080167 | A1 | * | 4/2005 | Bayer et al. | 524/2 |
| 2005/0282939 | A1 | * | 12/2005 | Weber et al. | 524/35 |

FOREIGN PATENT DOCUMENTS

| | | |
|---|---|---|
| DE | 39 29 400 | 3/1991 |
| DE | 42 06 850 | 9/1993 |
| DE | 100 41 311 | 3/2002 |
| DE | 103 04 816 | 8/2004 |
| DE | 103 52 081 | 6/2005 |
| EP | 0 327 351 | 8/1989 |
| EP | 0 384 046 | 8/1990 |
| EP | 0 504 870 | 9/1992 |
| EP | 1 445 278 A1 * | 8/2004 |
| EP | 1 506 979 A1 * | 2/2005 |
| EP | 1 529 805 | 5/2005 |
| EP | 1 529 805 A1 * | 5/2005 |

OTHER PUBLICATIONS

Cellulosics: Chem., Biochem. Mater. Aspects (1993), 325 330; "Highly effective thickening systems with cellulose ether combinations".

* cited by examiner

*Primary Examiner*—James J. Seidleck
*Assistant Examiner*—Rip A. Lee

(57) ABSTRACT

The present invention relates to a process for preparing cellulose ether products which is characterized in that superabsorbent polymers (SAPs) are dried and milled, or mill-dried, conjointly with moist cellulose ether and also to the cellulose ether products resulting from this process.

16 Claims, No Drawings

PREPARATION OF CELLULOSE ETHER PRODUCTS OF INCREASED VISCOSITY AND FINENESS

RELATED APPLICATIONS

This application claims benefit to German application no. 10 2005 038 584.2-44 filed Aug. 16, 2005 which is incorporated by reference in its entirety for all useful purposes.

BACKGROUND OF THE INVENTION

1. Field of Invention

The present invention relates to a process for preparing cellulose ether products which is characterized in that superabsorbent polymers (SAPs) are dried and milled, or mill-dried, conjointly with moist cellulose ether and also to the cellulose ether products resulting from this process.

2. Description of Related Art

Cellulose ethers have outstanding properties and therefore are widely used, for example as thickeners, adhesives, binders, dispersants, water retainers, protective colloids, stabilizers and also as suspending, emulsifying and filming agents.

It is common knowledge that cellulose ethers are prepared by alkaline destructurization of cellulose and subsequent etherification with etherifying reagents such as methyl chloride, ethylene oxide and propylene oxide. However, for the as-synthesized crude cellulose derivative to be useful in industrial applications it must first be washed, densified, milled and dried.

Its viscosity in aqueous solution is a pivotal factor in deciding the possible industrial uses of a cellulose ether. Its viscosity in an aqueous solution is chiefly determined by the chain length of its cellulose molecule and accordingly is dependent on the raw material used.

There continues to be a demand for production processes which for any given raw material lead to an increase in the viscosity of the product.

It is known for example from EP 0 384 046 that the type of mill chosen can have an effect on the viscosity of the cellulose ether obtained.

It is further well known that combining cellulose ethers with other additives or fillers makes it possible to achieve specific properties for industrial formulations.

U.S. Pat. No. 4,487,864 discloses a composition comprising a polyacrylamide-based SAP and a cellulose ether. It is said to achieve improved water retention in various building construction applications such as tile adhesives or plasters than is achieved with a cellulose ether alone. The compositions used are blends of powders of the individual components. These contain from 0.05% to 50% of the SAP.

A similar powder blend of cellulose ethers and SAP and also its use in wallpaper adhesives is described in DE 39 29 400.

EP 0327351 is to a composition wherein the SAPs are based on polyacrylic acid. The ratio of cellulose ether to SAP is in the range from 3:1 to 1:3 parts by weight. The preferred ratio is 1:1. The compositions used are blends of powders of the individual components.

The paper "Highly effective thickening systems with cellulose ether combinations" Cellulosics: Chem., Biochem Mater. Aspects (1993), 325-330 describes synergistic effects with regard to the viscosity in water on concurrent use of MHEC and SAP in a ratio of 1:1 parts by weight.

However, the processes described above are unable to provide products having a viscosity required for some applications. In addition, the fineness of the products prepared by the processes described above is in need of improvement.

SUMMARY OF THE INVENTION

It has now been found that, surprisingly, a process comprising the steps of
  (a) mixing a water-moist cellulose ether having a moisture content in the range from 25% to 75% by weight with 0.1% to 4% by weight based on the dry cellulose ether of a pulverulent SAP to produce a millbase and
  (b) drying and milling or mill-drying the millbase provides a cellulose ether product featuring the following properties:

higher viscosity in water compared with the prior art (powder compound) and/or higher fineness compared with the prior art (powder compound).

The invention accordingly further provides cellulose ether products including cellulose ether, 0.1% to 4% by weight based on the dry cellulose ether of an SAP and also optionally further additives, characterized in that the additive b) was metered as a powder into a water-moist cellulose ether having a moisture content in the range from 25% to 75% by weight, based on the weight of the moist cellulose ether, while mixing and, if appropriate, adding further water.

A DETAILED DESCRIPTION OF THE INVENTION

In accordance with the process of the present invention, water-moist cellulose ethers as present after the washing of crude cellulose ethers for example are mixed with SAP and if appropriate with continued addition of water adjusted by mixing to an ideal moisture content for subsequent operating steps. The SAP is here added in pulverulent form. The moist cellulose ethers thus additized are then dried and milled in a conventional manner, if desired in a single step (as a so-called mill-drying operation).

The cellulose ethers used are preferably methylcellulose and its derivatives.

Methylcellulose refers in the realm of this invention to any methyl-containing cellulose ether such as methylcellulose (MC), methylhydroxyethylcellulose (MHEC), methylhydroxypropylcellulose (MHPC), methylhydroxyethylhydroxypropylcellulose, methylethylhydroxyethylcellulose and methylhydroxyethylhydroxybutylcellulose.

The degree of alkyl substitution of a cellulose ether is generally described in terms of the degree of substitution (DS), DS is the average number of substituted OH groups per anhydroglucose unit (AGU). Methyl substitution, for example, is reported as DS (methyl) or DS (M).

The degree of hydroxyalkyl substitution is customarily described in terms of the molar substitution (MS). MS is the average number of moles of etherifying reagent which are attached in ether fashion per mole of anhydroglucose unit. Etherification with the etherifying reagent ethylene oxide, for example, is reported as MS (hydroxyethyl) or MS (HE). Etherification with the etherifying reagent propylene oxide is correspondingly reported as MS (hydroxypropyl) or MS (HP).

The side groups are determined using the Zeisel method (literature: G. Bartelmus and R. Ketterer, Z. Anal. Chem. 286 (1977) 161-190).

Particular preference is given to using methyl cellulose or methylhydroxyalkylcellulose. Methylhydroxyethylcellulose or methylhydroxypropylcellulose is the most preferred methylhydroxyalkylcellulose.

In the case of a methylhydroxyalkylcellulose, DS (methyl) is in the range from 0.9 to 3 and MS (hydroxyalkyl) is in the range from 0.05 to 1. Preferably, the DS (methyl) is in the range from 1.1 to 1.8 and the MS (hydroxyalkyl) in the range from 0.10 to 0.7. Most preferably, the DS (methyl) is in the range from 1.3 to 1.6 and the MS (hydroxyalkyl) in the range from 0.25 to 0.50. Methylhydroxyethylcelluloses are used in particular.

Following washing and filtration, the water-moist filter cakes typically obtained in the production of cellulose ethers have a moisture content in the range from 25% to 75% by weight, based on the weight of the moist cellulose ether. Preference is given to using such water-moist filter cakes as possess a moisture content in the range from 45% to 65% by weight.

These are mixed with the dry SAP powder, with the possibility if desired of admixing further water before, during or after this mixing operation in order that the moisture content of the granules of the blend may be adjusted. The further water is preferably added after the SAP has been mixed in.

The moisture content of the blend produced in this way (granule moisture content) is customarily in the range from 45% to 80% by weight based on the overall weight of the blend, preferably in the range from 60% to 75% by weight and more preferably in the range from 65% to 75% by weight.

Superabsorbent polymers (SAPs) for the purposes of this invention are crosslinked organic polymers which are swellable but not soluble in water. They swell with water to a multiple of their own weight, in some cases to several hundred times their own weight. SAPs contain lattice structures formed in the free radical copolymerization of polymerizable monomers with small amounts of crosslinking agent.

Suitable SAPs comprise, in chemical terms, crosslinked partially neutralized polyacrylic acids (partial) hydrolysates of starch-acrylonitrile graft copolymers, (partially) neutralized starch-acrylic acid graft copolymers, (partially) hydrolysed vinyl acetate-acrylic ester copolymers, (partially) hydrolysed acrylonitrile or acrylamide copolymers, crosslinked products of such hydrolysates and polymers of crosslinked cationic monomers. Specifically, the crosslinked superabsorbent polymers may contain the following monomers alone or combined:

acrylic acid, methacrylic acid, vinylsulphonic acid, styrenesulphonic acid, 2-(meth)acrylamide-2-methylpropanesulphonic acid, 2-(meth)acryloylethanesulphonic acid, 2-(meth) acraloylpropane-sulphonic acid and also the salts thereof. Further (meth)acrylamide, N-ethyl (meth)acrylates, N,N-dimethylaminopropyl (meth)acrylates, N,N-dimethylaminopropyl (meth)acrylamides and also their quaternary salts and vinylpyrrolidone. Useful crosslinkers include for example allyl methacrylate, diethylene glycol diacrylate, ethoxylated trimethylolpropane triacrylate, ethylene glycol diglycidyl ether, methylenebisacrylamide, tetraallyloxyethane, triallylamine and trimethylolpropane triacrylate. Further information about superabsorbents is to be found in the book "Modern Superabsorbent Polymer Technology", edited by Fredric L. Buchholz and Andrew T. Graham, Verlag Wiley—VCH (1998).

Preference is given to SAPs based on polyacrylate, polymethacrylate and also to corresponding copolymers.

The particle size distribution of SAP powders can be determined for example using laser diffraction methods (for example HELOS instruments with RODOS powder dispersion from Sympatec). The diffraction image produced by a particle system in the path of a laser beam is analysed according to Fraunhofer theory.

A particle size distribution is often characterized in terms of the X10, X50 and X90 values. These respectively describe the particle size corresponding to 10%, 50% and 90% of the cumulative distribution.

The invention preferably utilizes SAP powders having an X50 value of less than 250 µm and an X90 value of less than 400 µm. Preferably, the X50 value is less than 150 µm and the X90 value less than 300 µm and more preferably the X50 value is less than 100 µm and the X90 value less than 200 µm.

The amount of SAP used is in the range from 0.1% to 4% by weight based on the dry cellulose ether. Preference is given to using 0.5% to 2% by weight. Particular preference is given to using 0.6% to 1.2% by weight. The SAP is preferably admixed in powder form into the water-moist cellulose ether.

The process of the present invention, involving the addition of SAP, raises the viscosity of the resulting products, typically measured as an approximately 1.5% solution in water, compared with non-inventive pulverulent blends. The viscosity is preferably raised by more than 3% and more preferably by more than 6%. In particular even by more than 12%.

V2 viscosities of the products of the process of the present invention are typically more than 40 000 mPas, preferably greater than 70 000 mPas and most preferably greater than 85 000 mPas.

The V2 viscosity is the viscosity of a 2% by weight aqueous solution at a shear gradient of 2.55 s−1 and 20° C. measured using a rotary viscometer (for example a Haake VT 550).

In addition, the fineness of the cellulose ether products of the present invention is observed to be increased when the preferred amount of SAP, ranging from 0.5% to 2.0% by weight, is used. Fineness of a cellulose ether product refers in the context of this invention to the fraction (undersize) passing through a 0.063 mm sieve. The fineness of a cellulose ether product is typically increased by more than 15% and preferably by more than 25% relative to the control without incorporated SAP. Increased fineness is observed in particular for SAPs of fine particle size.

If desired or necessary it is possible to add further additives such as for example glyoxal and/or buffer mixtures, in the form of aqueous solutions for example, to the water-moist cellulose ether. Dissolution-retarded products are then obtained as a result. The preparation of dissolution-retarded cellulose derivatives has long been known to one skilled in the art.

The SAP-containing millbase is dried and milled, if desired in one operation (mill-drying). The drying and milling or mill-drying is carried out according to prior art methods. Preferably, the milling and drying is carried out combined in one operation. If desired or necessary, further prior art milling steps can be carried out in order that a further comminution of the products may be achieved.

Alternatively, the process conditions affecting the milling and drying or mill-drying can be varied so that the fineness of the products remains unchanged but the energy input for comminuting the products is reduced.

The invention further provides for the use of the cellulose ether products of the invention in building construction material systems.

The cellulose ether products of the invention preferably find use as additives in tile adhesives, plasters such as cement plaster or gypsum plaster, filling compounds, cementitious systems which are extruded, and other building construction materials.

To adapt the cellulose ether products for use in specific building construction material systems it is possible if desired or necessary to effect a further additization with pulverulent additives, as described in U.S. Pat. No. 4,654,085 for example.

EXAMPLES

The mill-drying unit used in Examples 1 to 11 and the mill-drying operation can be described as follows:

The milling unit consists of a sieveless high-speed gas flow rotary mill comprising seven milling tracks. The mill is connected on its downstream side to a cyclone separator and a bag filter. On its clean gas side is a fan which conveys the dustless gas flow into a heat exchanger, where the transport gas is superheated to the required drying temperature.

A metering screw is used to meter the granules into the mill at the level of the first and second milling tracks. A perforated plate upstream of the metering screw divides the supplied material into individual strands about 10 mm in diameter.

The incoming transport gas has a temperature in the range from 150 to 190° C. at standard pressure. After the mill, the temperature of the transport gas is in the range from 120 to 130° C. The amount of gas circulated is in the range from 1500 to 1700 cubic meters (measured under operating conditions) per hour (downstream of the mill). Excess transport gas is removed from the system.

The throughput of granules was set so as to give a throughput of about 20 kg/h of dry product.

Unless otherwise specified, the reported viscosities of the methylhydroxyethylcelluloses and methylhydroxypropylcelluloses were measured on solutions of the dry cellulose ethers in water at 20° C. and a shear gradient of 2.55 s$^{-1}$ (instrument: Haake Rotovisko VT 550)

Examples 1 to 8

In a 300 l ploughshare mixer from Lödige batches of 33 kg of a moist methylhydroxyethylcellulose (solids content 62% by weight, DS (M) 1.42 and MS (HE) 0.31) are intensively mixed at 30-20° C. with 1% by weight of SAP powder (see Table 1) based on dry MHEC and sprayed with water such that the resulting granules have a granule moisture content (based on total mass) in the range from 72% to 73% by weight. The granules are subsequently comminuted and concurrently dried in the mill-drying apparatus described above. Each run was carried out twice and the products obtained were analysed; Table 1 reports the mean values in each case (Examples 2, 4, 6 and 8).

A run was carried out without added SAP for comparison. The MHEC powder thus obtained was, after mill-drying, blended with the appropriate amount of SAP powder into a pulverulent compound (Comparative Examples 1, 3, 5 and 7).

TABLE 1

| Example | SAP | X50 | X90 | Viscosity 1.5% by weight | Change in viscosity | Comparison/ invention |
|---|---|---|---|---|---|---|
| 1 | Defosorb CL 200 AD | 93 | 169 | 34,760 |  | C |
| 2 | Defosorb CL 200 AD | 93 | 169 | 39,980 | +15.0% relative to Example 1 | I |
| 3 | Defosorb CL 350 | 178 | 290 | 34,330 |  | C |
| 4 | Defosorb CL 350 | 178 | 290 | 39,435 | +14.9% relative to Example 3 | I |
| 5 | Luquasorb 1010 | 40 | 93 | 37,450 |  | C |
| 6 | Luquasorb 1010 | 40 | 93 | 39,030 | +4.2% relative to Example 5 | I |
| 7 | Luquasorb 1030 | 216 | 365 | 33,840 |  | C |
| 8 | Luquasorb 1030 | 216 | 365 | 38,135 | +12.7% relative to Example 7 | I |

Defosorb® is a commercial name of Defotec. Luquasorb® is a commercial name of BASF. The Defosorb® and Luquasorb® products are SAPs based on polyacrylate and polymethacrylate.

Under otherwise comparable conditions, the process of the invention gives products having a distinctly higher viscosity.

Examples 9 to 11

In a 300 l ploughshare mixer from Lödige batches of 33 kg of a moist methylhydroxyethylcellulose (solids content 62% by weight, DS (M) 1.33 and MS (HE) 0.33) are intensively mixed at 30-20° C. with SAP powder (see Table 1) based on dry MHEC and sprayed with water such that the resulting granules have a granule moisture content (based on total mass) in the range from 72% to 73% by weight. The granules are subsequently comminuted and concurrently dried in the mill-drying apparatus described above which has just five milling tracks instead of seven. The use of just five milling tracks reduces the mechanical input of energy. At the same time, the gas circulation rate is set to 950 to 1050 cubic meters (under operating conditions) per hour (downstream of the mill). The incoming transport gas has a temperature in the range from 200 to 230° C. at standard pressure. After the mill, the temperature of the transport gas is in the range from 120 to 130° C.

TABLE 2

| Example | SAP | Amount used, % by weight | Viscosity, 1.0% by weight | Undersize fraction <0.125 mm % by weight | Undersize fraction <0.063 mm % by weight | Comparison/ invention |
|---|---|---|---|---|---|---|
| 9 | — | 0 | 11,450 | 68.4 | 33.3 | C |
| 10 | Defosorb CL 200 AD | 1.0 | 12,540 | 73.7 | 43.8 | I |
| 11 | Defosorb CL 200 AD | 2.0 | 11,690 | 74.1 | 40.8 | I |

The process of the invention provides products of distinctly higher viscosity (Example 10) and fineness relative to the comparative runs.

Examples 12 and 13

In a granulator, MHPC having a DS(M) of 1.60 and an MS(HP) of 0.16, in the form of a filter cake containing about 55% of water based on total mass, was admixed with 0.0% or 0.8% by weight of Defosorb CL 200 AD based on dry mass and subsequently adjusted with water to a moisture content of about 62% by weight based on total mass. The resulting granules were dried in a flow dryer to a moisture content of about 35% by weight and subsequently mill-dried in a Contra Selector screen basket mill from Pallmann.

The SAP-containing cellulose ether product has an increased viscosity and fineness. Each setting was run twice; Table 3 reports the mean values.

TABLE 3

| Example | SAP | Amount used, % by weight | Viscosity 2.0% by weight | Undersize <0.063 mm % by weight | Comparison/ invention |
|---|---|---|---|---|---|
| 12 | — | 0 | 57,300 | 44.5 | C |

All the references described above are incorporated by reference in its entirety for all useful purposes.

While there is shown and described certain specific structures embodying the invention, it will be manifest to those skilled in the art that various modifications and rearrangements of the parts may be made without departing from the spirit and scope of the underlying inventive concept and that the same is not limited to the particular forms herein shown and described.

We claim:

1. A process for preparing cellulose ethers of increased viscosity and increased fineness comprising:
    washing a crude cellulose ether to obtain a water-moist cellulose ether,
    mixing the water-moist cellulose ether, said water-moist cellulose ether having a moisture content in the range from 25% to 75% by weight, with 0.5% to 2.0% by weight based on the dry cellulose ether of a pulverulent superabsorbent polymer (SAP) to produce a millbase, and
    then drying and milling or mill-drying the millbase, whereby the fraction of produced cellulose ether passing through a 0.063 mm sieve is increased by more than 15% relative to a control cellulose ether prepared in the absence of an SAP.

2. The process according to claim 1, wherein the water-moist cellulose ether has a moisture content in the range from 45% to 65% by weight.

3. The process according to claim 1, wherein the millbase has a moisture content in the range from 45% to 80% by weight based on the total weight of the millbase.

4. The process according to claim 1, wherein the millbase has a moisture content in the range from 60% to 75% by weight based on the total weight of the millbase.

5. The process according claim 1, wherein the cellulose ether is selected from methyl cellulose or methylhydroxyalkyl cellulose.

6. The process according to claim 1, wherein the cellulose ether is methylhydroxyalkyl cellulose having a DS (methyl) of from 0.9 to 3 and an MS (hydroxyalkyl) of from 0.05 to 1.

7. The process according to claim 6, wherein the cellulose ether is methylhydroxyalkyl cellulose having a DS (methyl) of from 1.1 to 1.8 and an MS (hydroxyalkyl) of from 0.10 to 0.7.

8. The process according to claim 7, wherein the cellulose ether is methylhydroxyalkyl cellulose having a DS (methyl) of from 1.3 to 1.6 and an MS (hydroxyalkyl) of from 0.25 to 0.50.

9. The process according claim 1, wherein the SAP is selected from crosslinked partially neutralized polyacrylic acids, (partial) hydrolysates of starch-acrylonitrile graft copolymers, (partially) neutralized starch-acrylic acid graft copolymers, (partially) hydrolysed vinyl acetate-acrylic ester copolymers, (partially) hydrolysed acrylonitrile or acrylamide copolymers, crosslinked products of such hydrolysates and polymers of crosslinked cationic monomers.

10. The process according to claim 1, wherein 0.6% to 1.2% by weight based on the dry cellulose ether of a pulverulent SAP is used.

11. The process according to claim 2, wherein 0.6% to 1.2% by weight based on the dry cellulose ether of a pulverulent SAP is used.

12. The process according to claim 3, wherein 0.6% to 1.2% by weight based on the dry cellulose ether of a pulverulent SAP is used.

13. The process according to claim 5, wherein 0.6% to 1.2% by weight based on the dry cellulose ether of a pulverulent SAP is used.

14. The process according to claim 9, wherein 0.6% to 1.2% by weight based on the dry cellulose ether of a pulverulent SAP is used.

15. The process according to claim 6, wherein 0.6% to 1.2% by weight based on the dry cellulose ether of a pulverulent SAP is used.

16. The process according to claim 8, wherein 0.6% to 1.2% by weight based on the dry cellulose ether of a pulverulent SAP is used.

* * * * *